(12) United States Patent
Hochapfel et al.

(10) Patent No.: US 12,397,861 B2
(45) Date of Patent: Aug. 26, 2025

(54) CHASSIS COMPONENT HAVING A RECEPTACLE FOR AN ELASTOMER BEARING

(71) Applicant: BENTELER AUTOMOBILTECHNIK GMBH, Paderborn (DE)

(72) Inventors: Erik Hochapfel, Gudensberg (DE); Thomas Prus-Thorns, Paderborn (DE); Juergen Hummelt, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 18/125,822

(22) Filed: Mar. 24, 2023

(65) Prior Publication Data

US 2023/0303173 A1    Sep. 28, 2023

(30) Foreign Application Priority Data

Mar. 28, 2022    (DE) ...................... 10 2022 107 298.3

(51) Int. Cl.
*B62D 21/11*    (2006.01)
*B62D 21/15*    (2006.01)

(52) U.S. Cl.
CPC ............ *B62D 21/11* (2013.01); *B62D 21/155* (2013.01)

(58) Field of Classification Search
CPC ...... B62D 21/09; B62D 21/11; B62D 21/155; B62D 25/082; B60G 2204/418; B60G 2204/41; B60G 2204/4102; B60K 5/1216; F16F 2230/0005; F16F 2234/02; F16F 1/3863
See application file for complete search history.

(56) References Cited

U.S. PATENT DOCUMENTS

| | | | | |
|---|---|---|---|---|
| 2,925,974 A | * | 2/1960 | Aebersold | B60K 5/1216 267/134 |
| 3,072,448 A | * | 1/1963 | Melton | F16C 11/04 280/93.508 |
| 3,121,348 A | * | 2/1964 | Reed | B60G 7/001 74/588 |
| 4,202,564 A | * | 5/1980 | Strader | B60G 5/04 280/678 |
| 4,809,960 A | * | 3/1989 | Kakimoto | F16F 1/38 403/228 |

(Continued)

FOREIGN PATENT DOCUMENTS

| | | | | |
|---|---|---|---|---|
| CN | 105599811 A | * | 5/2016 | ............... B60K 5/12 |
| CN | 106184369 A | * | 12/2016 | ............. B62D 21/02 |

(Continued)

OTHER PUBLICATIONS

Office Action for German Application No. 10 2022 107 298.3 mailed Nov. 18, 2022; 16pp.

*Primary Examiner* — Timothy Wilhelm

(74) *Attorney, Agent, or Firm* — HAUPTMAN HAM, LLP

(57) ABSTRACT

A chassis component having a receptacle for an elastomer bearing(s), the receptacle has a first cylinder section and a second cylinder section. The first cylinder section is formed by a rim hole and the second cylinder section is formed by a sleeve. The chassis component is formed from a first and a second sheet metal shell, and the sleeve is joined materially to the second sheet metal shell.

17 Claims, 2 Drawing Sheets

(56) References Cited

U.S. PATENT DOCUMENTS

| | | | | |
|---|---|---|---|---|
| 5,695,213 A * | 12/1997 | Nakamura | ............ | B60G 7/001 |
| | | | | 280/124.134 |
| 6,109,654 A * | 8/2000 | Yamamoto | ............ | B62D 21/11 |
| | | | | 280/124.109 |
| 6,241,267 B1 * | 6/2001 | Dziadosz | ............ | B60G 7/001 |
| | | | | 280/124.135 |
| 6,328,513 B1 * | 12/2001 | Niwa | ............ | F16F 1/362 |
| | | | | 411/339 |
| 6,547,267 B1 * | 4/2003 | Heep | ............ | B60G 7/001 |
| | | | | 280/124.128 |
| 6,796,765 B2 * | 9/2004 | Kosel | ............ | F02C 7/00 |
| | | | | 29/523 |
| 6,997,276 B2 * | 2/2006 | Yoshida | ............ | B62D 21/11 |
| | | | | 180/312 |
| 7,100,264 B2 * | 9/2006 | Skinner | ............ | B23P 9/025 |
| | | | | 29/523 |
| 7,445,201 B2 * | 11/2008 | Endo | ............ | F16F 1/3863 |
| | | | | 267/141 |
| 7,445,243 B2 * | 11/2008 | Park | ............ | B62D 21/11 |
| | | | | 280/124.109 |
| 7,682,117 B2 * | 3/2010 | Holt | ............ | F02M 55/025 |
| | | | | 403/408.1 |
| 7,726,674 B2 * | 6/2010 | VanDenberg | ............ | B60G 11/62 |
| | | | | 267/257 |
| 7,874,059 B2 * | 1/2011 | Morrison | ............ | F16B 5/0266 |
| | | | | 29/889 |
| 8,128,308 B2 * | 3/2012 | Skinner | ............ | B23P 9/025 |
| | | | | 29/523 |
| 8,388,000 B2 * | 3/2013 | Hessing | ............ | B21D 53/88 |
| | | | | 280/124.134 |
| 8,414,002 B2 * | 4/2013 | Yu | ............ | B60G 7/001 |
| | | | | 280/124.134 |
| 8,777,196 B2 * | 7/2014 | Kumper | ............ | F16F 1/3814 |
| | | | | 267/293 |
| 8,783,796 B2 * | 7/2014 | Thorson | ............ | B62D 55/092 |
| | | | | 305/138 |
| 9,010,716 B2 * | 4/2015 | Kobori | ............ | F16F 1/3735 |
| | | | | 248/635 |
| 9,422,003 B2 * | 8/2016 | Yun | ............ | B62D 21/11 |
| 9,797,443 B2 * | 10/2017 | Spinella | ............ | F16C 27/063 |
| 9,908,572 B2 * | 3/2018 | Brooks | ............ | B62D 55/14 |
| 10,179,609 B2 * | 1/2019 | Stenzenberger | ....... | B62D 21/11 |
| 10,391,828 B2 * | 8/2019 | Jager | ............ | B62D 21/11 |
| 10,953,719 B2 * | 3/2021 | Kiehn | ............ | B62D 21/11 |
| 10,967,693 B2 * | 4/2021 | Meyer | ............ | B60G 7/001 |
| 11,421,723 B2 * | 8/2022 | Maruyama | ............ | F16B 4/004 |
| 11,466,714 B2 * | 10/2022 | Arndt | ............ | F16B 43/001 |
| 11,999,213 B2 * | 6/2024 | Berger | ............ | B60G 7/001 |
| 2002/0140146 A1 * | 10/2002 | Nakagawa | ............ | F16F 1/3873 |
| | | | | 267/141.2 |
| 2007/0262503 A1 * | 11/2007 | Rogge | ............ | F16F 1/3863 |
| | | | | 267/293 |
| 2015/0217808 A1 * | 8/2015 | Haselhorst | ............ | B62D 21/11 |
| | | | | 280/124.109 |
| 2017/0297398 A1 | 10/2017 | Jager et al. | | |
| 2018/0023604 A1 * | 1/2018 | Stastny | ............ | B62D 27/065 |
| | | | | 403/376 |
| 2019/0023322 A1 * | 1/2019 | Haselhorst | ............ | B62D 21/11 |
| 2019/0061453 A1 * | 2/2019 | Branger | ............ | B60G 7/001 |
| 2021/0309061 A1 * | 10/2021 | Sieve | ............ | B60G 7/001 |
| 2023/0028093 A1 * | 1/2023 | Protzmann | ............ | B60K 5/1216 |

FOREIGN PATENT DOCUMENTS

| | | | | |
|---|---|---|---|---|
| CN | 108622199 A | * | 10/2018 | |
| CN | 111284561 A | * | 6/2020 | |
| CN | 112078354 A | * | 12/2020 | |
| CN | 114056430 A | * | 2/2022 | |
| CN | 116534126 A | * | 8/2023 | |
| DE | 102005013133 A1 | * | 9/2006 | |
| DE | 102014222577 A1 | | 5/2016 | |
| DE | 102015200352 A1 | | 7/2016 | |
| DE | 102015208898 B3 | * | 8/2016 | ............ B62D 21/11 |
| DE | 102011052398 B4 | | 11/2016 | |
| DE | 102015210915 A1 | | 12/2016 | |
| DE | 102016107155 A1 | | 10/2017 | |
| DE | 102016113021 A1 | * | 1/2018 | ............ B62D 21/11 |
| DE | 102019131716 B4 | | 1/2022 | |
| EP | 4349692 A2 | * | 4/2024 | ............ B62D 21/11 |
| WO | WO-2005123487 A1 | * | 12/2005 | ............ B62D 21/11 |
| WO | WO-2005123488 A1 | * | 12/2005 | ............ B62D 21/11 |
| WO | WO-2022064116 A1 | * | 3/2022 | ............ B62D 21/11 |

* cited by examiner

CHASSIS COMPONENT HAVING A RECEPTACLE FOR AN ELASTOMER BEARING

RELATED APPLICATIONS

The present application claims priority of German Application Number 10 2022 107 298.3 filed Mar. 28, 2022, the disclosure of which is hereby incorporated by reference herein in its entirety.

FIELD

The disclosure relates to a chassis component.

The chassis is part of a motor vehicle. The chassis is responsible for passenger comfort and makes a contribution to driving dynamics and safety by ensuring that the forces generated in the contact zones between the road and the tire are transmitted in an optimum manner. The chassis is a complex combination of chassis components which serve to connect the body to the roadway.

BACKGROUND

In motor vehicles, chassis components are connected to the body, drive components or other chassis components via bearing(s). Elastomer bearing(s) are used in chassis assemblies for motor vehicles. They are mounted at the connection points to the vehicle body, to the transmission, to the drive unit or to chassis links in order, for example, to decouple the vibration or noises of the differential. Elastomer bearing(s) are able to absorb forces by deformation of the elastomer and are pressed by means of the outer sleeve into a correspondingly prepared receptacle of the chassis component.

Sleeves are used to receive the elastomer bearing(s), as described by DE 10 2019 131 716 B4. The sleeves are able to be made, for example, from a tube section or are able to be designed as a slotted or rolled sleeve. The sleeves are joined to the chassis component or are riveted or screwed to the chassis component in the form of separate parts, for example, as a forged part. In order to join the sleeves materially, a sufficient free space, e.g., for a welding unit, should be ensured and a corresponding projection for the formation of the welded seam should additionally be provided structurally. In the case of complex installation spaces, said configuration leads to design limitations.

Alternatively, the receptacle is able to be designed as a double-sided rim hole, as shown in DE 10 2016 107 155 A1 and DE 10 2011 052 398 B4. A rim hole in a workpiece is able to be formed, for example, by a punching, drilling, roller forming or spreading method. In the case of a rim hole, connection by means of joining is therefore eliminated. The execution of the rim hole is demanding in terms of production technology and limited to a maximum depth of the rim hole collars. This is a disadvantage compared with the sleeve solution, in which the depth of the receptacle is not limited. In the chassis sector, rim hole depths of between 18 mm and 20 mm are nowadays common. Elastomer bearing(s) are able to have a height of more than 60 mm. The rim hole thus limits the height of the elastomer bearing(s), or a distance is created between the rim holes which is able to adversely affect the secure retention of the elastomer bearing(s) and lead to manufacturing problems. Owing to the fact that the rim hole collars cannot be deformed to an arbitrary depth, the friction area with respect to the elastomer bearing(s) and thus the maximum effective press-out force is reduced.

DE 10 2015 200 352 A1 describes a link for a wheel suspension of a vehicle having a receptacle for an elastomer body. This publication is able to be referred to as defining the type in question.

DE 10 2015 210 915 A1 also describes a link for a wheel suspension of a vehicle having a bearing(s) receptacle. The receptacle is formed by a bushing and two opposing rim holes.

DE 10 2014 222 577 A1 describes a control arm with a ball joint in press-fit connection.

SUMMARY

At least one embodiment of the disclosure provides a chassis component having an improved receptacle for an elastomer bearing(s), which ensures a large friction area between the elastomer bearing(s) and the receptacle and doing so with as few joining operations as possible, thus enabling the receptacle to be implemented in installation spaces with limited free space.

According to at least one embodiment of the disclosure, a chassis component includes a receptacle for an elastomer bearing(s).

A chassis component is, for example, a subframe, longitudinal member, crossmember or A arm. The receptacle of the chassis component has a first and a second cylinder section, wherein the first cylinder section is formed by a rim hole and the second cylinder section is formed by a sleeve.

The chassis component according to at least one embodiment of the disclosure is formed from a first and a second sheet metal shell. The two sheet metal shells are assembled to form the chassis component and joined to or along the contacting limbs. The sheet metal shells form a hollow profile, at least in some location or locations. The rim hole is a materially unitary part of a first sheet metal shell. According to at least one embodiment of the disclosure, the sleeve is joined materially to a second sheet metal shell. The sleeve is able to be designed, for example, as a slotted, perforated, multi-layered rolled or longitudinally joined sheet/tube.

The rim hole and the sleeve are arranged on a common central longitudinal axis. The end faces of the inner end of the sleeve and of the collar of the rim hole are situated opposite one another so as to rest against one another. The clearance is between 0.1 and 10 mm, between 0.2 and 5 mm and between 0.3 and 3 mm.

The structural length of the receptacle is able to be adapted to the elastomer bearing(s), such as by adapting the sleeve length or the depth of the rim hole. The receptacle is able to be adapted to the height of the elastomer bearing(s) by means of the distance between the end faces of the sleeve and the collar.

The combination of a sleeve and a rim hole ensures a large friction area of the receptacle with the elastomer bearing(s). At the same time, locations which are critical in terms of installation space since are able to be responded to, in comparison with the pure sleeve solution, one of the two joining operations is able to be omitted. The sleeve becomes shorter and thus less expensive than the pure sleeve solution. The rim hole is able to be executed at a depth that is non-critical in terms of production technology and cost-effective. The combination of a sleeve and a rim hole is able to be used for many receptacles of chassis components, such as for subframes and A arms and control arms.

In at least one embodiment of the receptacle, the sleeve is joined, for example welded, to the second sheet metal shell over an entire circumference of the sleeve in the region of an opening of the second sheet metal shell. The opening is circular or oval. Alternatively, the sleeve also is able be joined materially to the second sheet metal shell in the region of a part-circular opening of the second sheet metal shell, for example a semicircle, such as by means of a weld seam and at the end of a control arm leg. The opening of the second sheet metal shell is able to be arranged in a recess, thus ensuring that the outer end of the joined sleeve does not project beyond the surface of the second sheet metal shell, or terminates flush with the second sheet metal shell. In this context, the surface of the second sheet metal shell is understood to be the section around the elastomer bearing(s). This notwithstanding, the second sheet metal shell also is able to be designed to be recessed in a section at least 200 mm away from the elastomer bearing(s), for example, at an opposite end of the chassis component.

In at least one embodiment of the receptacle, the inner end of the sleeve and the collar of the rim hole are able to overlap in a certain region and, for example, are able to be connected to one another in a non-positive and/or positive manner. The receptacle is able to be adapted to the height of the elastomer bearing(s) by means of the height of the overlap between the sleeve and the collar.

Sheets of a steel alloy are used as the material for the chassis component. The sleeve is made of a material different from the sheet metal shells, but also of a steel material. The sheet metal shells also is able to have tailor-made properties, for example, in respect of mechanical characteristics or wall thicknesses. The chassis component is painted. The chassis component is able to have a corrosion protection coating.

BRIEF DESCRIPTION OF THE DRAWINGS

The disclosure is described below with reference to drawings. In the drawings.

DETAILED DESCRIPTION

Figure 1:
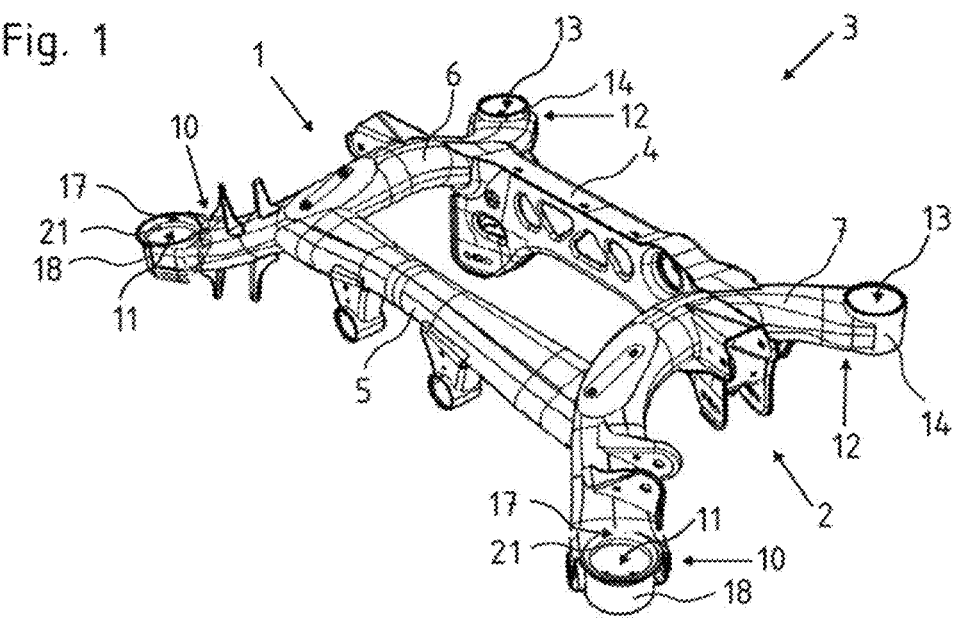
FIG. 1 shows a chassis component as part of a subframe in a perspective view according to at least one embodiment of the disclosure.

FIG. 1 shows chassis components in the form of two longitudinal members 1, 2, which are part of a subframe 3. The longitudinal members 1, 2 are connected to one another by two crossmembers 4, 5.

The chassis components are formed from a main body 6, 7. The main body 6, 7 has two sheet metal shells 8, 9. The sheet metal shells 8, 9 are formed by pressing and are arranged one above the other in the image plane with the exception of overlapping joining regions.

A receptacle 11 according to at least one embodiment of the disclosure is arranged in each case at a rear end 10 of the main body 6, 7 in the direction of travel of the motor vehicle. A bearing(s) receptacle 13 is provided at a front end 12. In FIG. 1, the bearing(s) receptacles 13 are embodied as long sleeves 14. The long sleeves 14 are joined to the sheet metal shells 8, 9 of the main body 6, 7. According to at least one embodiment of the disclosure, the receptacles 11 have a first cylinder section 15 and a second cylinder section 16, wherein the first cylinder section 15 is formed by a rim hole 17 in the first sheet metal shell 8 and the second cylinder section 16 is formed by a sleeve 18. The sleeve 18 of the second cylinder section 16 is joined to the second sheet metal shell 9.

Figure 2:
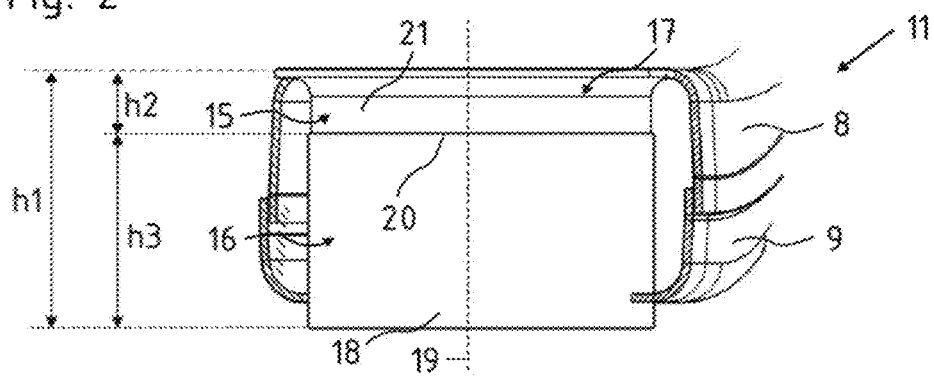
FIG. 2 shows a perspective front view of a receptacle according to at least one embodiment of the disclosure.

FIG. 2 shows the detail view of a receptacle 11 according to at least one embodiment of the disclosure for an elastomer bearing(s). The rim hole 17 and the sleeve 18 are arranged on a common central longitudinal axis 19. The inner end 20 of the sleeve 18 and the collar 21 of the rim hole 17 rest on the end face. The height h1 of the receptacle 11 is able to be adapted to the elastomer bearing(s) by means of the height h2 of the collar 21 of the rim hole 17 and the height h3 of the sleeve 18.

FIG. 3, FIG. 4, FIG. 5, and FIG. 6 show some embodiments of the receptacle 22, 23, 24, 25 for the elastomer bearing(s).

Figure 3:
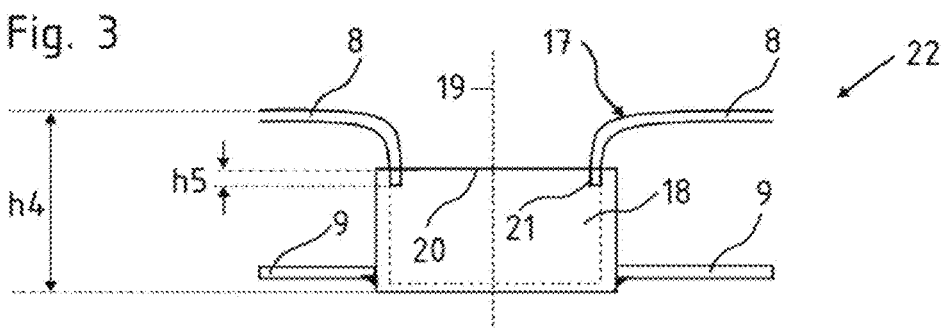
FIG. 3 shows a front view of the receptacle according to at least one embodiment of the disclosure.

FIG. 3 shows at least one embodiment of the disclosure in the form of the receptacle 22, in which the inner end 20 of the sleeve 18 and the collar 21 of the rim hole 17 overlap in a certain region and are connected to one another in a non-positive manner. The height h4 of the receptacle 22 is able to be adapted to the elastomer bearing(s) by means of the height h5 of the overlap.

Figure 4:
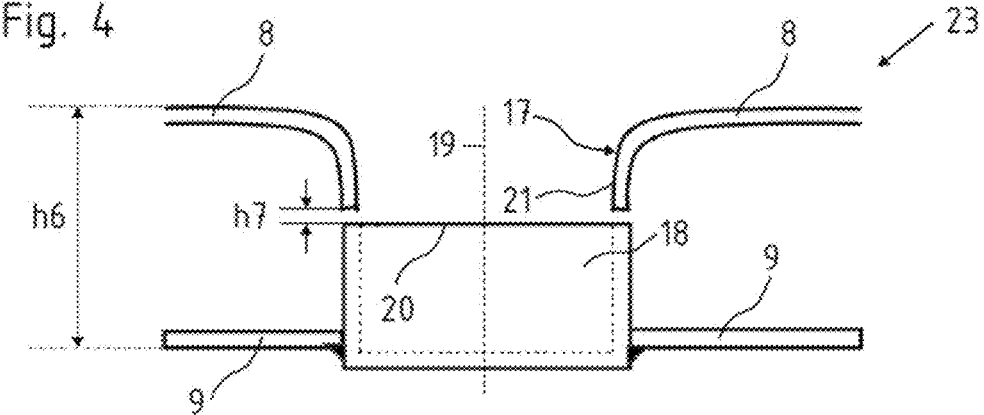
FIG. 4 shows a front view of the receptacle according to at least one embodiment of the disclosure.

FIG. 4 shows at least one embodiment of the disclosure in the form of the receptacle 23, in which the end faces of the inner end 20 of the sleeve 18 and of the collar 21 of the rim hole 17 are situated opposite one another. The height h6 of the receptacle 23 is able to be adapted to the elastomer bearing(s) by way of the clearance h7 between the inner end 20 of the sleeve 18 and the collar 21 of the rim hole 17.

Figure 5:
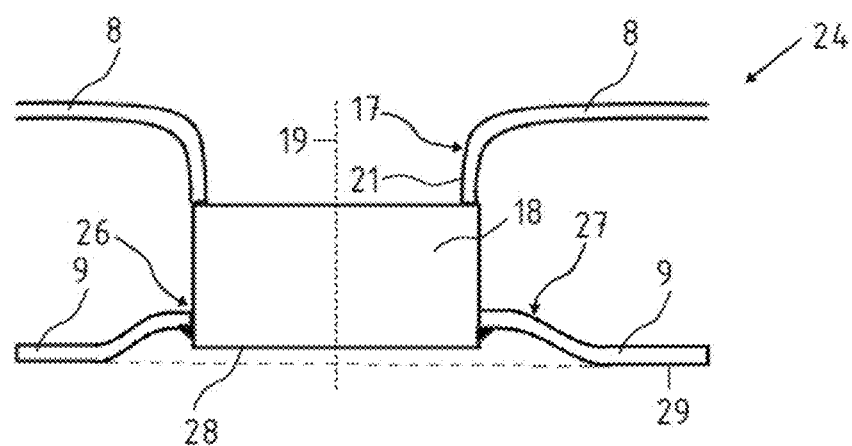
FIG. 5 shows a front view of the receptacle according to at least one embodiment of the disclosure.

As shown in FIG. 5, at least one embodiment of the disclosure the opening 26 of the second sheet metal shell 9 is able to be arranged in a recess 27, thus ensuring that the outer end 28 of the joined sleeve 18 does not project beyond the surface 29 of the second sheet metal shell 9.

Figure 6:
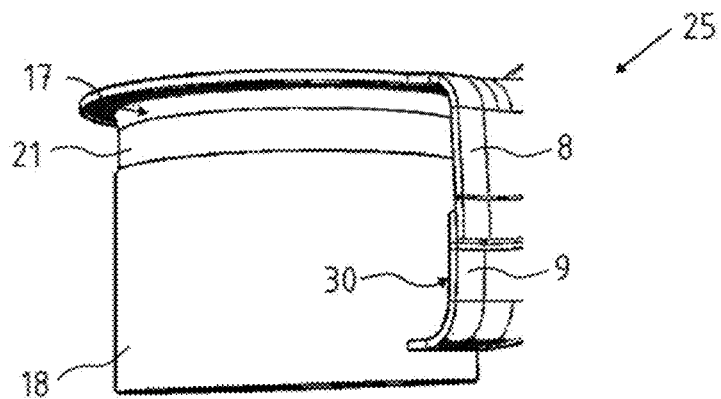
FIG. 6 shows a perspective view of the receptacle according to at least one embodiment of the disclosure.

FIG. 6 shows at least one embodiment of the disclosure, in which the sleeve 18 is joined materially to the second sheet metal shell 9 by means of a semicircular weld seam in the region of a semicircular opening 30 of the second sheet metal shell 9.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A chassis component, comprising:
a receptacle for an elastomer bearing;
a first sheet metal shell connected to the receptacle; and
a second sheet metal shell connected to the receptacle, the receptacle comprising a first cylinder section and a second cylinder section, the first cylinder section comprising a rim hole and the second cylinder section comprising a sleeve, wherein the sleeve is welded to the second sheet metal shell, wherein the rim hole projects inwardly from the first sheet metal shell in a direction towards the sleeve and the second sheet metal shell, an end face of the sleeve and an end face of a collar of the rim hole are situated opposite one another, the rim hole and the sleeve are on a common central longitudinal axis, and along the common central longitudinal axis, an entirety of the sleeve is spaced from an entirety of the collar of the rim hole.

2. The chassis component according to claim 1, wherein the sleeve is welded to the second sheet metal shell over a circumference in entirety of the sleeve at a region of an opening of the second sheet metal shell.

3. The chassis component according to claim 1, wherein the rim hole is a materially unitary part of the first sheet metal shell.

4. The chassis component according to claim 1, wherein the sleeve is welded to the second sheet metal shell in a region of an opening of the second sheet metal shell.

5. The chassis component according to claim 4, wherein the opening of the second sheet metal shell is in a recess of the second sheet metal shell.

6. The chassis component according to claim 4, wherein an outer end of the sleeve does not project beyond a surface of the second sheet metal shell.

7. The chassis component according to claim 1, wherein the sleeve is welded to the second sheet metal shell in a region of a part-circular opening of the second sheet metal shell.

8. The chassis component according to claim 1, wherein an inner end of the sleeve and the collar of the rim hole overlap one another when viewed from an overhead perspective of the chassis component.

9. The chassis component according to claim 1, wherein the chassis component is a link.

10. The chassis component according to claim 1, wherein an inner end of the sleeve and the collar of the rim hole are connected to one another in a non-positive manner.

11. The chassis component according to claim 1, wherein an inner end of the sleeve and the collar of the rim hole are connected to one another in a positive manner.

12. The chassis component according to claim 1, wherein the chassis component is a subframe of a motor vehicle or a part thereof.

13. The chassis component according to claim 1, wherein the chassis component is an engine frame of a motor vehicle or a part thereof.

14. The chassis component according to claim 1, wherein
along the common central longitudinal axis, the end face of the sleeve faces toward, and is spaced from, the end face of the collar of the rim hole.

15. The chassis component according to claim 14, wherein
the entirety of the sleeve is outside the rim hole.

16. A chassis component, comprising:
a receptacle for an elastomer bearing;
a first sheet metal shell connected to the receptacle; and
a second sheet metal shell connected to the receptacle, the receptacle comprising a first cylinder section and a second cylinder section, the first cylinder section comprising a rim hole and the second cylinder section comprising a sleeve,
wherein
the sleeve is welded to the second sheet metal shell,
an end face of the sleeve and an end face of a collar of the rim hole are situated opposite one another,
the rim hole and the sleeve are on a common central longitudinal axis, and
along the common central longitudinal axis, an entirety of the sleeve is spaced from an entirety of the collar of the rim hole.

17. The chassis component according to claim 16, wherein the sleeve is welded to the second sheet metal shell over a circumference in entirety of the sleeve at a region of an opening of the second sheet metal shell.

* * * * *